A. H. CLARK.
CLUTCH.
APPLICATION FILED NOV. 5, 1920.
1,424,987.
Patented Aug. 8, 1922.
2 SHEETS—SHEET 1.
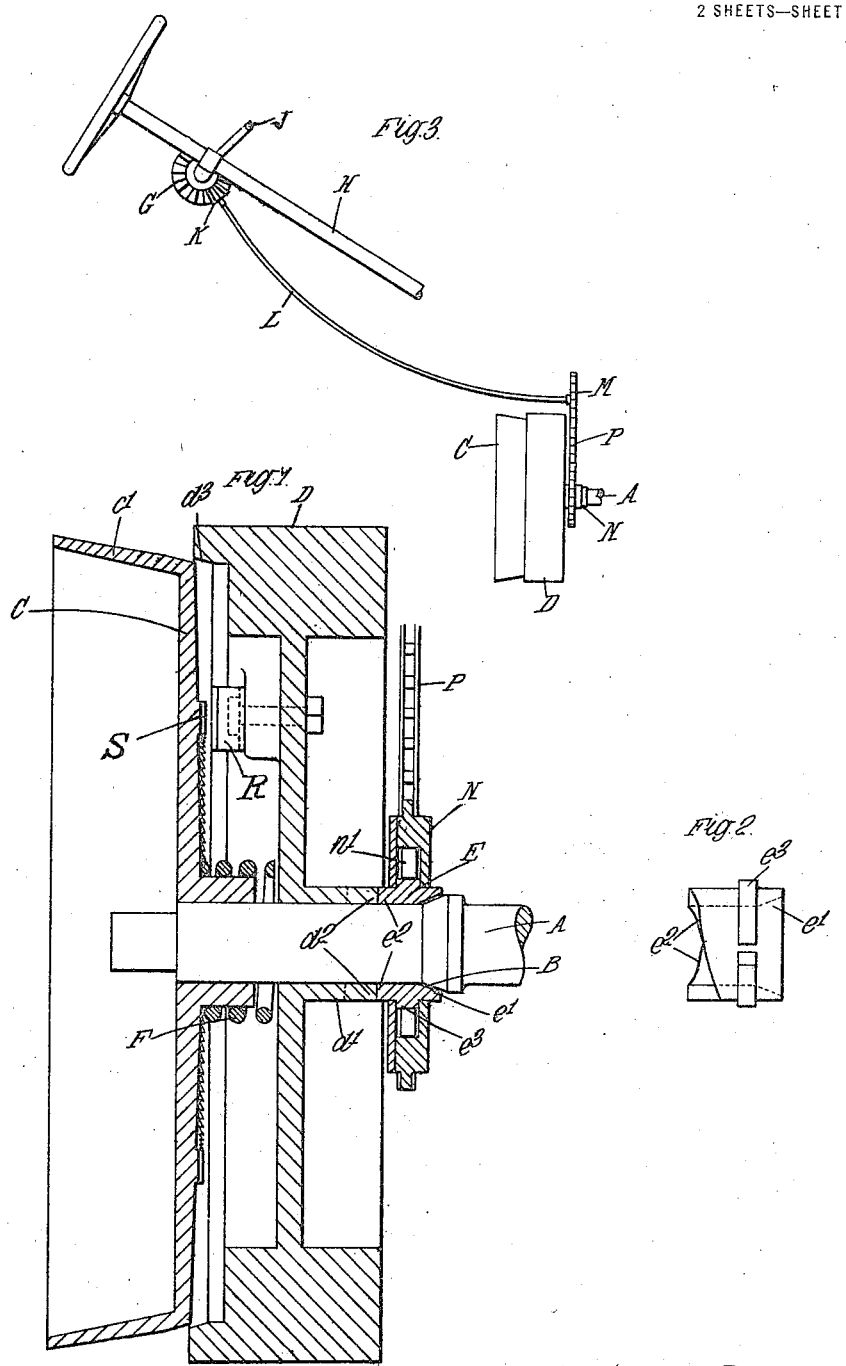

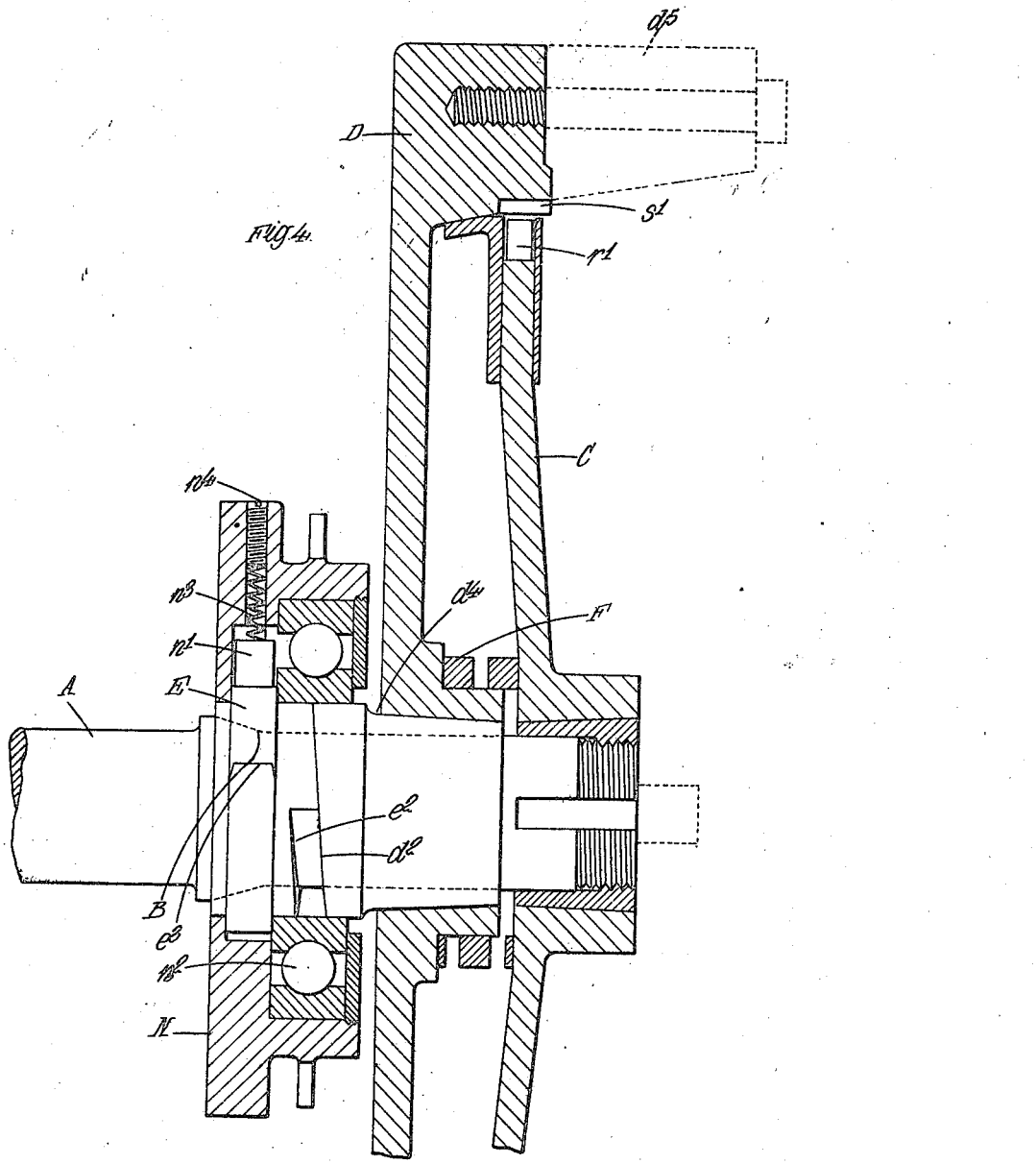

UNITED STATES PATENT OFFICE.

ALBERT HAWKINS CLARK, OF MOLESEY, ENGLAND.

CLUTCH.

1,424,987.　　　Specification of Letters Patent.　　Patented Aug. 8, 1922.

Application filed November 5, 1920. Serial No. 422,111.

*To all whom it may concern:*

Be it known that I, ALBERT HAWKINS CLARK, a subject of the King of Great Britain, residing at Sunningdale, Molesey, in the county of Surrey, England, have invented certain new and useful Improvements in or Relating to Clutches, of which the following is a specification.

This invention relates to clutches and engine starters, that is to say, to apparatus in which power is intended to be transmitted either from a rotary body to the shaft on which it runs, or from the said shaft to the said rotary body, and in which occasional disconnection and re-connection are required.

An object of this invention is to provide clutch mechanism which on rotation being imparted to a fly wheel or pulley will automatically cause the said fly wheel or pulley to be operatively connected to the shaft on which it runs, and in which when stationary disconnection can be effected by a slight rotary movement of an auxiliary clutch member. A further object of the invention is to provide clutch mechanism as aforesaid in which the rotation of the crank shaft of an internal combustion engine can be started by means of power accumulated in the fly wheel by the operation of the said auxiliary clutch member before operative connection between the said fly wheel and crank shaft has been established, whilst ensuring that the fly wheel and crank shaft remain securely connected so long as the engine is running, and can be easily disconnected when required.

In order that the said invention may be clearly understood and readily carried into effect, the same will now be described more fully with reference to the accompanying drawings, in which:—

Figure 1 represents in vertical section apparatus embodying this invention and suitable as starting gear for an internal combustion engine employed in an automobile vehicle, the fly wheel being shown in the position in which it is disconnected from the shaft.

Figure 2 represents in elevation a portion of the auxiliary driving device detached.

Figure 3 is a diagram illustrating by way of example a mode of actuating the auxiliary driving device.

Figure 4 is a vertical section illustrating a modified form of the apparatus, the fly wheel being shown in the position in which it is connected to the shaft.

The reference letter A indicates the crank shaft of an internal combustion engine, on which shaft is a coned surface B, and a disc or friction clutch member C is secured to the shaft, whilst a fly wheel D is, in the position shown in Figure 1, free to revolve on the said shaft or to slide axially thereon. A sleeve E is also freely rotatable and axially movable on the shaft A, this sleeve being internally coned at one end as shown at $e^1$ and provided with helical teeth $e^2$ at the other end and with ratchet teeth $e^3$ on its periphery. The boss $d^1$ of the fly wheel D is also provided with corresponding helical teeth at $d^2$, so that when the sleeve M is driven in the direction in which the shaft A is to be rotated by the engine, the fly wheel D is also driven, both the sleeve and fly wheel revolving freely between the fixed frictional parts or clutch members B and C, while a spring F tends to keep the fly wheel D clear of the member C. The extension of this spring is, however, not sufficient to permit of its pressing the conical tapered end $e^1$ of the sleeve E against the cone B on the shaft A. The sleeve E can be driven by hand or foot power or by a motor; in the example shown in Figure 3 a bevel wheel G is mounted in a suitable bearing on the steering pillar H and is rotatable by means of a cranked handle J, this wheel G engaging a bevel pinion K on a flexible shaft L, at the other end of which shaft is a sprocket wheel M. The shaft L may either be curved as shown or may be made up of straight portions connected by a universal joint or joints. A sprocket wheel N can revolve freely on the sleeve E, and can be driven by a chain P from the wheel M. The boss of this wheel N carries a pawl $e^4$ adapted to engage the ratchet teeth $e^3$ on the sleeve, and thereby to cause the sleeve to revolve upon the shaft A in the direction in which the engine runs.

In starting the engine the fly wheel D is rapidly revolved by means of the gear described acting through the pawl $n^1$, ratchet teeth $e^3$, and the helical teeth $e^2$, $d^2$. When sufficient momentum has been imparted to the fly wheel, the supply of power to the sleeve E is discontinued whereupon the superior inertia of the fly wheel compared with that of the sleeve causes the teeth $d^2$ to over-run the teeth $e^2$ thus forcing the fly wheel and the sleeve apart. The coned end $e^1$ of the sleeve is thus brought into contact with the cone B on the shaft A, and the sleeve E is therefore frictionally connected with the said shaft. At the same time the fly wheel moves along the shaft, compressing the spring F, and the coned portion $d^3$ of the fly wheel is brought into frictional contact with the coned portion $c^1$ of the disc by a screwing motion due to the form of the helical teeth $e^2$, $d^2$, thus operatively connecting the fly wheel with the disc and the shaft A. The connection thus established between the fly wheel and the shaft causes the energy stored in the former to be rapidly communicated to the latter, and the engine to turn through its cycle and commence working.

It will be seen that as the sleeve E is clutched on the shaft by means of the frictional engagement of its conical internal surface $e^1$ with the cone B while the engine is running, the helical teeth thereon continue in the same relative position with regard to the teeth on the boss of the fly wheel D, so that there is no liability due to slip of the sleeve E to disconnection of the fly wheel while the engine runs.

The fly wheel D can be released when it is next required to start the engine by renewing the supply of power to the sleeve E, which may be accomplished by the action of the hand gear shown in Figure 3, the said sleeve being thus revolved against the frictional resistance caused by the pressure between the coned parts B and $e^1$. To facilitate this action only one or two ratchet teeth $e^3$ are provided, so that some momentum may be given to the wheel N by turning it through half a revolution before the pawl $n^1$ engages one of the said ratchet teeth thus causing sufficient shock on engagement to release the cone $e^1$ from the cone B as the helical teeth $e^2$, $d^2$ enter fully into mesh while the spring F presses the fly wheel against the sleeve, and on the supply of power to the sleeve being again discontinued the fly wheel is reconnected.

If immediate re-connection is not required, the renewed rotation of the sleeve E should only proceed to the extent necessary to bring the helical teeth fully into mesh.

As shown in Figure 4 the fly wheel D may be provided with a bush $d^4$ on which the helical teeth $d^2$ are formed; the wheel N may run on ball bearings $n^2$, and the pawl $n^1$ may be pressed against the ratchet teeth $e^3$ by a spring $n^3$, the pressure of which spring may be adjusted by means of a screw plug $n^4$. The disc C may form a part of the main clutch of the vehicle, or the fly wheel may be extended as shown in dotted lines at $d^5$ in Figure 4 for this purpose, the shape of the extension being designed to suit the vehicle clutch which is to be employed.

For locking the fly wheel to the disc C when frictionally engaged, a stiff spring or pawl R may be provided on the fly wheel as shown in Figure 1, engaging a circular rack S on the disc, or the rack may be on the fly wheel at $s^1$ as shown in Figure 4, and six or other number of pawls $r^1$ may be spaced out around the periphery of the disc C.

In the case of a pulley which is to be operatively connected to a shaft, such pulley being arranged in the same manner as above described with reference to the fly wheel D, it is obvious that when a movement of rotation is by any means imparted to such pulley in a forward direction whilst the sleeve E is at rest, the helical teeth $d^2$ over-running the teeth $e^2$ will bring about the required connection and the following rotary movement of the sleeve E will bring about disconnection when so required.

The clutch mechanism may be varied and the position of the mechanism in relation to the engine may be altered without departing from the nature of this invention.

What I claim and desire to secure by Letters Patent of the United States is:—

1. In a clutch for operatively connecting and disconnecting a rotary body with a shaft on which it rotates, the combination of a shaft, a rotary body thereon, two fixed clutch members on the said shaft, the rotary body being axially movable between the said clutch members and adapted to engage with one of them, a rotary sleeve having cam surfaces adapted to engage counter cam surfaces on the rotary body and a coned surface adapted to engage the other fixed clutch member, and means for imparting rotary movement to the said sleeve.

2. In a clutch for operatively connecting and disconnecting a rotary body with a shaft on which it rotates, the combination of a shaft, a rotary body thereon, the rotary body being axially movable between the said clutch members and adapted to engage with one of them, a rotary sleeve having cam surfaces adapted to engage counter cam surfaces on the rotary body and a coned surface adapted to engage the other fixed clutch member, automatic means for pressing the said rotary body towards the said sleeve and means for imparting rotary movement to the said sleeve.

3. In a clutch for operatively connecting and disconnecting a rotary body with a shaft on which it rotates, the combination of a shaft, a rotary body thereon, a fixed clutch member on the said shaft, engageable with the said rotary body, an auxiliary clutch engaging said rotary body, means for imparting rotation to the said auxiliary clutch and rotary body in unison, interacting means between the said auxiliary clutch and rotary body for disconnecting them and engaging said auxiliary clutch with said shaft, and automatic means for re-connecting said auxiliary clutch and rotary body.

4. In a clutch for operatively connecting and disconnecting a rotary body with a shaft on which it rotates, the combination of a shaft, a rotary body thereon, a disc secured on the said shaft, frictional engaging surfaces on the said disc and on the said rotary body, rack and pawl locking devices adapted to engage each other and located one on the said disc and the other on the said rotary body, an auxiliary clutch engaging said rotary body, means for imparting rotation to the said auxiliary clutch and rotary body in unison, inter-acting means between the said auxiliary clutch and rotary body for disconnecting them and engaging said auxiliary clutch with said shaft and automatic means for re-connecting said auxiliary clutch and rotary body.

5. In a clutch for operatively connecting and disconnecting a rotary body with a shaft on which it rotates, the combination of a shaft, a rotary body thereon, a clutch member secured on the said shaft, and engageable with the said rotary body, a sleeve rotatable and axially movable on the said shaft, helical engaging surfaces on the said sleeve and the said rotary body, conical engaging surfaces on the said sleeve and the said shaft, a spring tending to force the rotary body away from the said clutch member and toward the said sleeve, and driving mechanism to rotate the said sleeve.

6. In a clutch for operatively connecting and disconnecting a rotary body with a shaft on which it rotates, the combination of a shaft, a rotary body thereon, a clutch member secured on the said shaft and engageable with the said rotary body, a sleeve rotatable and axially movable on the said shaft, helical engaging surfaces on the said sleeve and the said rotary body, conical engaging surfaces on the said sleeve and the said shaft, a spring tending to force the rotary body away from the said clutch member, and toward the said sleeve, a rack on the said sleeve, a wheel rotatable on the said sleeve and carrying a pawl adapted to engage said rack, and driving mechanism to rotate said wheel.

7. In a clutch for operatively connecting and disconnecting a rotary body with a shaft on which it rotates, the combination of a shaft, a rotary body thereon, a clutch member secured to said shaft, an auxiliary clutch member rotatable and axially movable on said shaft, helical engaging surfaces permanently in contact between the said body and auxiliary clutch member, and intermittent driving mechanism for said auxiliary clutch member.

8. In a clutch for operatively connecting and disconnecting a rotary body with a shaft on which it rotates, the combination of a shaft, a rotary body thereon, a clutch member secured to said shaft, a sleeve having teeth engaging teeth on said body and adapted to transmit to said body rotary motion when fully meshed and axial motion when partly meshed, intermittent driving mechanism for the said sleeve, and automatic means for disconnecting said body, said automatic means being adapted to act when said intermittent driving mechanism is actuated.

9. In a clutch for operatively connecting and disconnecting a rotary body with a shaft on which it rotates, the combination of a shaft, a rotary body thereon, auxiliary mechanism for temporarily rotating said body, mechanical means for disconnecting said body from said shaft when said body is rotated by said auxiliary mechanism, and automatic mechanical means for re-connecting said body to said shaft, said automatic means being adapted to act when said temporary rotation is discontinued.

ALBERT HAWKINS CLARK.